United States Patent
Ostwald et al.

(10) Patent No.: US 7,146,622 B2
(45) Date of Patent: Dec. 5, 2006

(54) STORAGE LIBRARY HAVING FREE-HANGING ROBOT ASSEMBLY

(75) Inventors: Timothy C. Ostwald, Louisville, CO (US); Joseph Paul Manes, Arvada, CO (US); Daniel J. Plutt, Superior, CO (US); Jon Benson, Superior, CO (US)

(73) Assignee: Storage Technology Corporation, Louisville, CO (US)

( * ) Notice: Subject to any disclaimer, the term of this patent is extended or adjusted under 35 U.S.C. 154(b) by 566 days.

(21) Appl. No.: 10/728,057

(22) Filed: Dec. 4, 2003

(65) Prior Publication Data

US 2005/0125816 A1 Jun. 9, 2005

(51) Int. Cl.
*G11B 17/22* (2006.01)
(52) U.S. Cl. ..................................... 720/654
(58) Field of Classification Search ................ 720/654; 360/92, 98.04, 98.06; 369/30.39, 30.43, 369/30.45, 30.63
See application file for complete search history.

(56) References Cited

U.S. PATENT DOCUMENTS

| | | | | |
|---|---|---|---|---|
| 4,271,440 A | * | 6/1981 | Jenkins et al. | 360/92 |
| 4,561,078 A | * | 12/1985 | Nakayama | 369/30.78 |
| 4,817,070 A | | 3/1989 | Hug et al. | |
| 4,846,619 A | * | 7/1989 | Crabtree et al. | 414/273 |
| 4,989,191 A | * | 1/1991 | Kuo | 369/30.76 |
| 5,019,927 A | | 5/1991 | Simone | |
| 5,253,246 A | | 10/1993 | Leonhardt et al. | |
| 5,285,333 A | | 2/1994 | Barr et al. | |
| 5,455,810 A | | 10/1995 | Luffel | |
| 5,544,146 A | | 8/1996 | Luffel et al. | |
| 5,546,366 A | * | 8/1996 | Dang | 369/30.39 |
| 5,548,567 A | * | 8/1996 | Sawai | 369/30.39 |
| 5,870,245 A | | 2/1999 | Kersey et al. | |
| 5,940,356 A | | 8/1999 | Toumbas | |
| 6,309,162 B1 | * | 10/2001 | White | 414/273 |
| 6,441,991 B1 | | 8/2002 | Ostwald et al. | |
| 6,515,822 B1 | | 2/2003 | White et al. | |
| 6,621,655 B1 | * | 9/2003 | White et al. | 360/92 |
| 6,778,351 B1 | * | 8/2004 | Coffin et al. | 360/92 |
| 6,956,715 B1 | * | 10/2005 | Mueller et al. | 360/92 |

FOREIGN PATENT DOCUMENTS

EP    0 289 986 A2    11/1988

* cited by examiner

*Primary Examiner*—Angel Castro
(74) *Attorney, Agent, or Firm*—Brooks Kushman P.C.

(57) ABSTRACT

A storage library which enables capacity expansion without additional robotics hardware includes a frame, first and second modules having respective cells, and a robot. The frame supports the first module at a first frame length position such that the first cells are positioned at the first frame length position and along the periphery of a channel extending within the frame interior through the frame length. The frame supports the second module when the second module is mounted to the frame such that the second cells are positioned at the second frame length position and along the channel periphery. The robot has a support connected to the frame and a picker movably connected to the support. The picker moves through the channel to manipulate media elements held by the first cells, and to manipulate media elements held by the second cells when the second module is mounted to the frame.

19 Claims, 5 Drawing Sheets

STORAGE LIBRARY HAVING FREE-HANGING ROBOT ASSEMBLY

BACKGROUND OF THE INVENTION

1. Field of the Invention

The present invention relates generally to storage libraries for handling and storing media elements such as cartridges and for reading and writing to the media elements using media element players such as drives. More particularly, the present invention relates to a storage library having a free-hanging media element handling robot assembly.

2. Background Art

An automated data storage library generally includes media storage elements such as cartridges, media element players such as drives, and media element handling components such as a media element handling robot assembly. The library includes individual cells which hold respective cartridges. The robot assembly includes a picker which is operable to move about the library and selectively load a cartridge from a cell into a drive. The picker is generally operable to remove cartridges from the cells and drives and load cartridges into the cells and drives.

Certain storage library designs enable the libraries to be expandable for capacity upgrades. Many storage library expansion solutions require complex installation techniques at the library user's site. Some solutions require costly robot assembly duplication, while other solutions require skilled personnel to link existing robot assemblies with the expansion mechanics.

For example, a capacity upgrade may involve adding more storage library modules in a stacked configuration with pass through robotics connecting the individual enclosures of the storage library modules. Other solutions offer a capacity improvement that involve adding additional guide ways (rails) for robot assembly hardware already existing in the storage library. The new guide ways enable the picker to access new slots. In both cases, it is a problem to add capacity to the storage library because additional robot assembly hardware is required. It would be desirable if storage library capacity expansion did not require manipulation, addition, modification, etc., to the robot assembly already part of the storage library.

U.S. Pat. No. 5,870,245 discloses an example of a storage library which suffers from the problem of requiring additional robotics assembly hardware to accommodate capacity upgrades. For example, the disclosed storage library is expandable by inserting additional storage library modules into a rack. Each additional storage library module adds capacity to the storage library by adding more cartridges and/or drives. Each storage library module includes a drive shaft for moving a picker. The rear of the enclosures form a U-shaped channel for receiving a pulley system. The pulley system moves the picker to and from the drive shafts of the storage library modules in order to move the picker assembly amongst the storage library modules. As such, adding additional storage library modules necessitates adding additional robotics assembly hardware. In this case, adding additional drive shafts is needed to accommodate the additional storage library modules.

SUMMARY OF THE INVENTION

Accordingly, it is an object of the present invention to provide a storage library having a free-hanging media element handling robot assembly.

It is another object of the present invention to provide a storage library having a media element handling robot assembly connected to a top end of a storage library frame in which the robot assembly is operable to telescopically extend from the top frame end through a channel formed within the interior of the storage library frame by media element holding cells of a storage library module positioned beneath the top frame end in order to manipulate media elements held by the cells of the storage library module while being connected to the top frame end.

It is a further object of the present invention to provide a storage library having a media element handling robot assembly connected to a bottom end of a storage library frame in which the robot assembly is operable to telescopically extend from the bottom frame end through a channel formed within the interior of the storage library frame by media element holding cells of a storage library module positioned above the bottom frame end in order to manipulate media elements held by the cells of the storage library while being connected to the bottom frame end.

It is still another object of the present invention to provide a method for expanding the capacity of a storage library by providing a media element handling robot assembly which is operable to telescopically extend through a channel formed within the interior of the frame by media element holding cells of a storage library expansion module added to the frame in order to manipulate media elements held by the cells of the storage library expansion module while being connected to the storage library frame.

In carrying out the above objects and other objects, the present invention provides a storage library having a frame, first and second storage library modules, and a media element handling assembly. The frame has an interior and a frame length. The first storage library module has a first set of media element holding cells and is mounted to the frame at a first position along the frame length. The frame supports the first storage library module such that the first set of cells are positioned within the frame interior at the first frame length position and along the periphery of a channel extending within the frame interior through the frame length.

The second storage library module has a second set of media element holding cells and is mountable to the frame at a second position along the frame length. The frame supports the second storage library module when the second storage library module is mounted to the frame such that the second set of cells are positioned within the frame interior at the second frame length position and along the periphery of the channel.

The media element handling assembly has a support and a picker assembly. The support is connected to the frame at a third position along the frame length and the picker assembly is movably connected to the support. The first and second storage library modules are void of media element handling assembly hardware for moving the picker assembly through the channel along the frame length. The picker assembly is operable for moving through the channel along the frame length in order to move toward the first frame length position and manipulate media elements held by the first set of cells, and to move toward the second frame length position and manipulate media elements held by the second set of cells when the second storage library module is mounted to the frame.

The frame may have top and bottom ends vertically separated by the frame length and the support of the media element handling assembly may be connected to either one of the top and bottom frame ends.

Further, in carrying out the above objects and other objects the present invention provides another storage library having a frame, a first storage library module, and a media element handling assembly. The frame includes top and bottom ends and an interior with the top and bottom frame ends being separated by a frame length. The top and bottom frame ends may be vertically separated by the frame length. The first storage library module has a first set of media element holding cells and is mounted to the frame beneath the top frame end at a first position along the frame length. The frame supports the first storage library module such that the first set of cells are positioned within the frame interior at the first frame length position and along the periphery of a channel extending within the frame interior between the top and bottom frame ends through the frame length.

The media element handling assembly has a support and a picker assembly. The support is connected to the top frame end. The picker assembly is movably connected to the support such that the picker assembly is operable for moving through the channel along the frame length between the top and bottom frame ends in order to move toward the first frame length position and manipulate media elements held by the first set of cells while being connected to the support.

This storage library may further include a second storage library module having a second set of media element holding cells. The second storage library module is mountable to the frame beneath the top frame end at a second position along the frame length. The frame supports the second storage library module when the second storage library is mounted to the frame such that the second set of cells are positioned within the frame interior at the second frame length position and along the periphery of the channel. The picker assembly is operable for moving through the channel along the frame length between the top and bottom frame ends in order to move toward the second frame length position and manipulate media elements held by the second set of cells while being connected to the support when the second storage library module is mounted to the frame.

The first and second storage library modules are void of media element handling assembly hardware for moving the picker assembly through the channel.

The first storage library module may further includes a first media player. The frame supports the first storage library module such that the first media player is positioned within the frame interior at the first frame length position on the periphery of the channel. The picker assembly is operable for moving through the channel in order to move toward the first and second frame length positions and load media elements held by the first and second sets of cells into the first media player while being connected to the support when the second storage library module is mounted to the frame.

The media element handling assembly may further include a platform and a suspension drive mechanism. The suspension drive mechanism is connected to the support. The platform is movably connected to the suspension drive mechanism and the picker assembly is supported on the platform. The suspension drive mechanism movably suspends the platform away from the support in order to move the picker assembly through the channel along the frame length from the top frame end to the bottom frame end. The suspension drive mechanism also movably retracts the platform back towards the support in order to move the picker assembly through the channel along the frame length from the bottom frame end to the top frame end.

The suspension drive mechanism may include either suspension cables or scissor legs connected to the platform for movably suspending the platform away and toward the support.

The platform may include a carriage assembly operable for moving the picker assembly across the platform. The picker assembly may be rotatably supported on the platform. A communication cable may be connected at one end to the picker assembly via the platform and connected at the other end to the support. The communication cable is operable to suspend out from the support as the platform moves away from the support and enables communication with the picker assembly.

Also, in carrying out the above objects and other objects, the present invention provides a method for a storage library having a frame with an interior and a frame length. This storage library further includes a media element handling assembly having a support and a picker assembly movably connected to the support with the support being connected to the frame.

The method includes mounting a first storage library module having a first set of media element holding cells to the frame at a first position along the frame length away from the support such that the first set of cells are positioned within the frame interior at the first frame length position and along the periphery of a channel extending within the frame interior through the frame length. The method further includes moving the picker assembly through the channel along the frame length in order to move the picker assembly toward the first set of cells for the picker assembly to manipulate media elements held by the first set of cells while the picker assembly is movably connected to the support.

After the picker assembly has manipulated a media element held by one of the first set of cells, the method includes expanding the capacity of the storage library by mounting a second storage library module having a second set of media element holding cells to the frame at a second position along the frame length away from the support such that the second set of cells are positioned within the frame interior at the second frame length position and along the periphery of the channel. The method then includes moving the picker assembly through the channel along the frame length in order to move the picker assembly toward the second set of cells for the picker assembly to manipulate media elements held by the second set of cells while the picker assembly is movably connected to the support.

After the picker assembly has manipulated a media element held by one of the second set of cells, the method may also include expanding the capacity of the storage library further by mounting a third storage library module having a third set of media element holding cells to the frame at a third position along the frame length away from the support such that the third set of cells are positioned within the frame interior at the third frame length position and along the periphery of the channel. In this event, the method then includes moving the picker assembly through the channel along the frame length in order to move the picker assembly toward the third set of cells for the picker assembly to manipulate media elements held by the third set of cells while the picker assembly is movably connected to the support.

Alternatively, after the picker assembly has manipulated a media element held by one of the first set of cells, the method may also include reducing the capacity of the storage library by dismounting one of the first and second storage library modules from the frame. In this event, the method then includes moving the picker assembly through the channel along the frame length in order to move the picker assembly toward the set of cells remaining within the frame interior for the picker assembly to manipulate media elements held by the remaining set of cells while the picker assembly is movably connected to the support.

The advantages associated with the present invention are numerous. For instance, the free-hanging robot assembly enables media element and/or media element player capacity to be added to the storage library without adding additional robot assembly hardware components. As a result, economical storage library modules having cartridges and/or drives and not having robot assembly hardware can be inserted into the frame of the storage library.

DETAILED DESCRIPTION OF THE PREFERRED EMBODIMENT(S)

Figure 1:
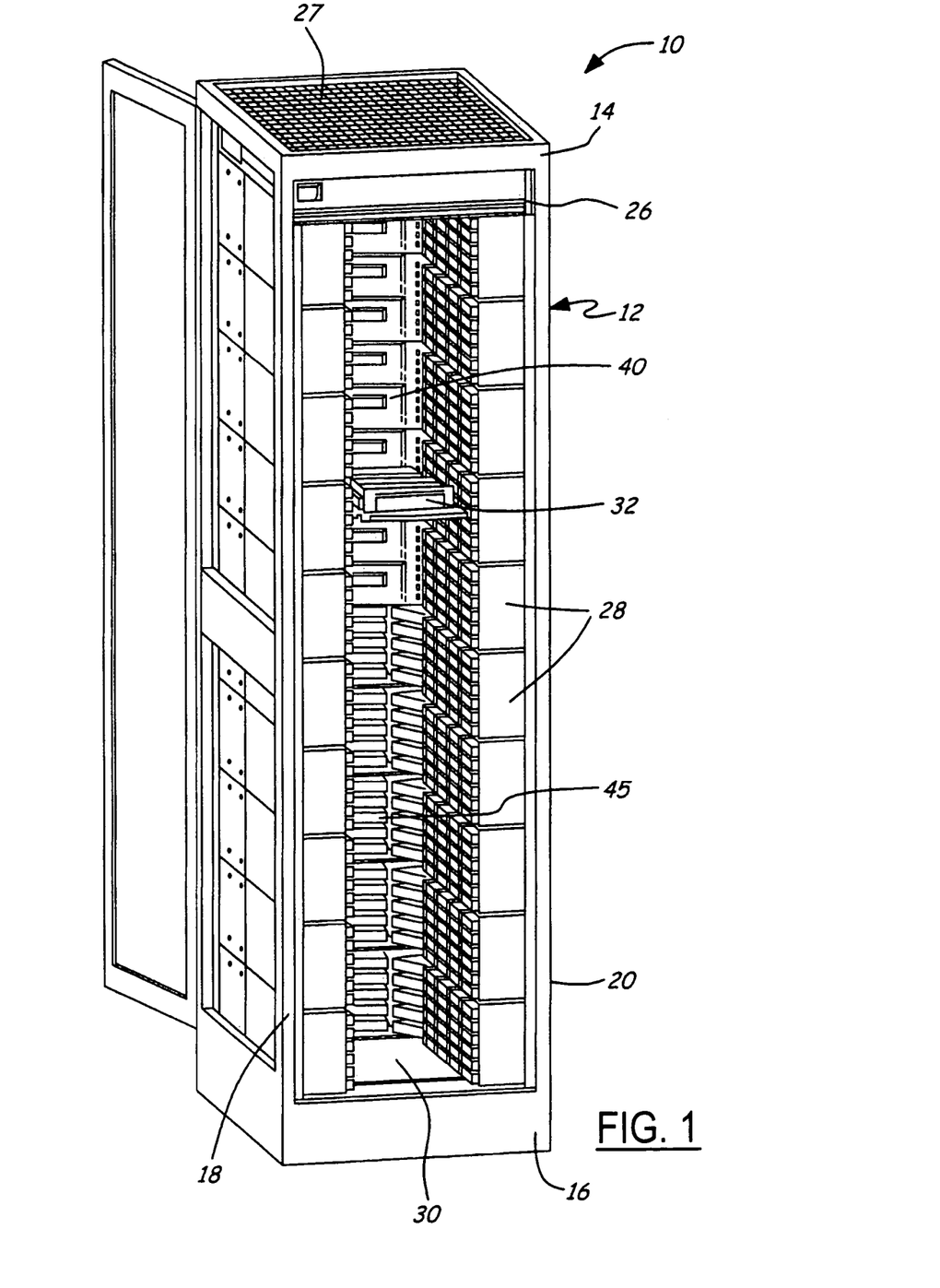
FIG. 1 illustrates a perspective view of a rack-mounted storage library in accordance with a preferred embodiment of the present invention.
Figure 2:
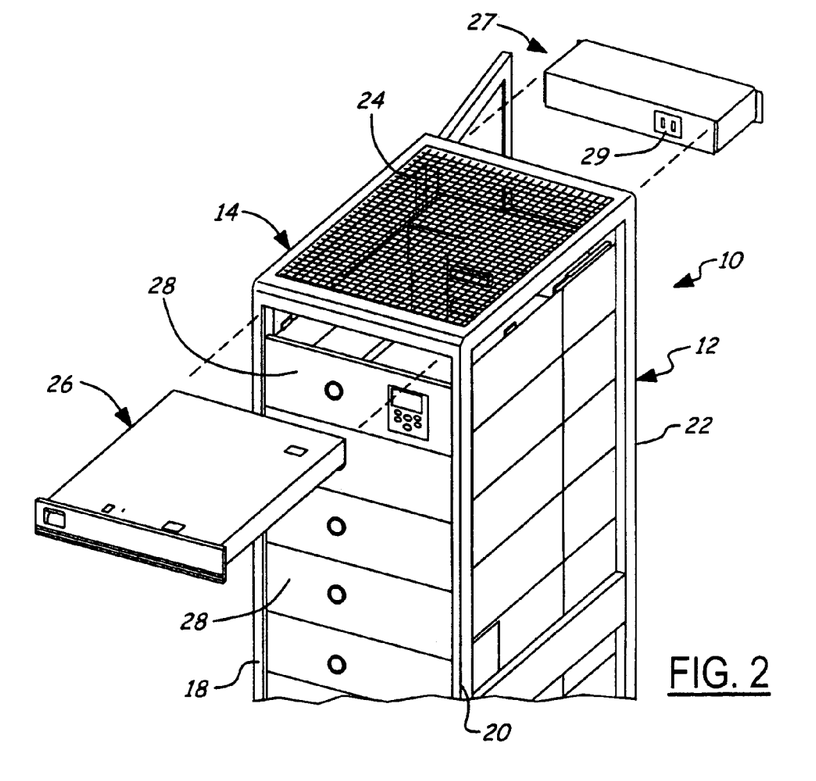
FIG. 2 illustrates a top view of the rack-mounted storage library with a self-contained robotics module and a controller module both being removed out of the rack of the storage library.

Referring now to FIGS. 1 and 2, a rack-mounted storage library 10 in accordance with a preferred embodiment of the present invention is shown. Storage library 10 is a data storage and retrieval system for a computer and is designed for handling and storing media elements such as cartridges and for reading and writing to the media elements using media element players as drives. A media element denotes any physical substrate suitable for storing data. A media element player is a reader and/or writer, i.e., a drive, which translates the data stored on a media element into signals readable by the computer for reading operations and/or writes data to the media element in response to a command from the computer for writing operations.

Storage library 10 includes a rack (e.g., frame) 12. Rack 12 has a vertically upright, rectangular form formed by top and bottom rack portions 14 and 16 and four legs 18, 20, 22, and 24 extending therebetween. Legs 18, 20, 22, and 24 are placed at respective corners of top and bottom rack portions 14 and 16. Legs 18, 20, 22, and 24 form a rectangular interior within rack 12. Bottom rack portion 16 is placed on a support structure such as a floor to support the weight of storage library 10.

A self-contained media element handling robotics module 26 is positioned within the interior of rack 12 preferably adjacent to top rack portion 14. Robotics module 26 is an integrated replaceable unit which contains media element handling robotics. Robotics module 26 can be plugged into and plugged out of a spacing within rack 12 of storage library 10 in a modular manner. Robotics module 26 may be removed and installed from the front or back side of rack 12. As shown in FIG. 1, robotics module 26 is plugged into rack 12 within its respective spacing of the interior formed by the rack. As shown in FIG. 2, robotics module 26 is plugged out from rack 12. As such, robotics module 26 facilitates modular replacement and removal of the media element handling robotics into and out of storage library 10.

A power/controller module 27 is positioned within the interior of rack 12 preferably adjacent to both top rack portion 14 and robotics module 26 when the robotics module is positioned within the rack. Power/controller module 27 includes a power supply for supplying the power required by the media element handling robotics of robotics module 26. Power/controller module 27 includes control electronics for generating electrical control signals to control the operation of the media element handling robotics of robotics module 26. Power/controller module 27 can be plugged into and plugged out of its spacing within rack 12. As shown in FIG. 1, power/controller module 27 is plugged into rack 12 within its respective spacing. As shown in FIG. 2, power/controller module 27 is plugged out from rack 12.

Robotics module 26 and power/controller module 27 are electrically connected to one another when both modules are mounted in rack 12. Robotics module 26 and power/controller module 27 include corresponding self-mating plug-connectors 29 on their back sides which plug into one another in order to connect these modules together.

Storage library 10 includes a plurality of storage library modules 28. Storage library modules 28 are positioned within the interior of rack 12. Rack 12 receives each storage library module 28 within a respective spacing provided by the rack. Storage library modules 28 include media elements 45 such as cartridges and/or includes media element players 40 such as drives. Cartridges 45 are individually supported within housing cells in storage library modules 28. Drives 40 are operable to read and write data to cartridges 45 when the cartridges are loaded into the drives.

FIG. 1 illustrates storage library 10 having a storage library module 28 positioned in each available storage library spacing provided by rack 12. Storage library modules 28 are removably connected to and supported by legs 18, 20, 22, and 24. Storage library modules 28 are in a vertical stack and form a continuous channel 30 along their height. Robotics module 26 is positioned above the vertical stack of storage library modules 28. The capacity of storage library 10 may be expanded by inserting storage library modules 28 into rack 12 of the storage library. Similarly, the capacity of storage library 10 may be reduced by removing storage library modules 28 from rack 12 of the storage library.

As indicated above, robotics module 26 includes media element handling robotics, i.e., a media element handling picker assembly 32. Picker assembly 32 is self-containable within robotics module 26. Picker assembly 32 is operable to telescopically drop out from robotics module 26 and then move amongst storage library modules 28 by moving up-and-down through channel 30. Picker assembly 32 is operable to selectively grab a cartridge 45 from a cell of one storage library module 28 and then move this cartridge to another location in this storage library module or to any location in the other storage library modules.

In particular, picker assembly 32 is operable to move to a cell holding a desired cartridge 45, engage the desired cartridge and remove it from its cell, move the desired cartridge to a location adjacent to a selected drive 40, and then load the desired cartridge into the selected drive. As noted above, drive 40 may be contained in a different storage library module 28. In this event, picker assembly 32 moves up or down along channel 30 from storage library module 28 containing the desired cartridge 45 to the storage library module containing the desired drive 40. As such, picker assembly 32 is operable to grab a cartridge 45 from a first storage library module 28 located at one end of the stack, move the cartridge along channel 30 to a second storage library module 28 located at the other end of the stack, and load the cartridge into a drive 40 (or another cell) of the second storage library module.

Storage library modules 28 do not contain media element handling robotics as robotics module 26 provides the media element handling robotics (i.e., picker assembly 32) required for handling the cartridges in storage library modules 28. Picker assembly 32 may include a reader for reading labels on cartridges 45 and drives 40 of storage library modules 28 in order to keep track of the location of the contents of storage library 10.

Figure 3:
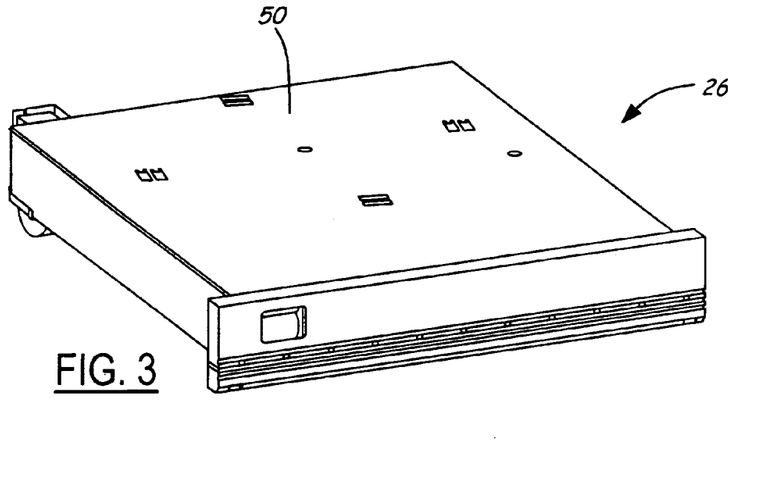
FIG. 3 illustrates a top-side perspective view of the self-contained robotics module in which a free-hanging media element handling robot assembly is fully recessed within the robotics module and a communications cable is fully retracted within the robotics module.
Figure 4:
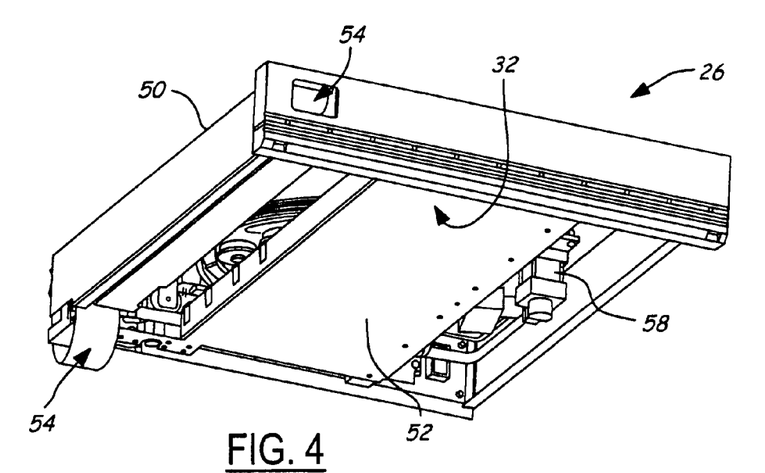
FIG. 4 illustrates a bottom-side perspective view of the self-contained robotics module with the free-hanging media element handling robot assembly being fully recessed within the robotics module and the communications cable being fully retracted within the robotics module.

Referring now to FIGS. 3, 4, 5, 6, and 7, self-contained robotics module 26 will now be described in greater detail. FIGS. 3 and 4 respectively illustrate top and bottom side perspective views of robotics module 26. In FIGS. 3 and 4, picker assembly 32 is fully recessed within a housing 50 of robotics module 26 and an electronics communications cable 54 is fully retracted within the robotics module. Picker assembly 32 includes a platform 52. Platform 52 is shown in FIG. 4 as being fully recessed along a bottom-side of housing 50.

When picker assembly 32 is in the fully recessed position within housing 50 of robotics module 26 and communications cable 54 is fully retracted within the robotics module, the robotics module can be removably plugged into and pulled out from its respective spacing in rack 12 of storage library 10. Removing robotics module 26 from rack 12 of storage library 10 effectively removes all of the media element handling robotic assembly hardware out of storage library 10. Similarly, plugging robotics module 26 into rack 12 of storage library 10 effectively adds all of the media element handling robotic assembly hardware to the storage library.

Figure 5:
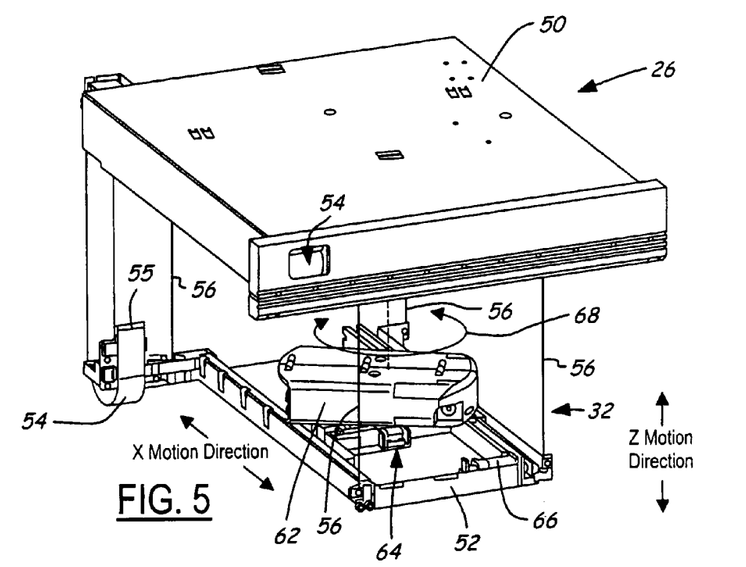
FIG. 5 illustrates a top-side perspective view of the robotics module with the free-hanging media element handling robot assembly being moved out from its recessed position within the robotics module and the communications cable being extended out from the robotics module.
Figure 6:
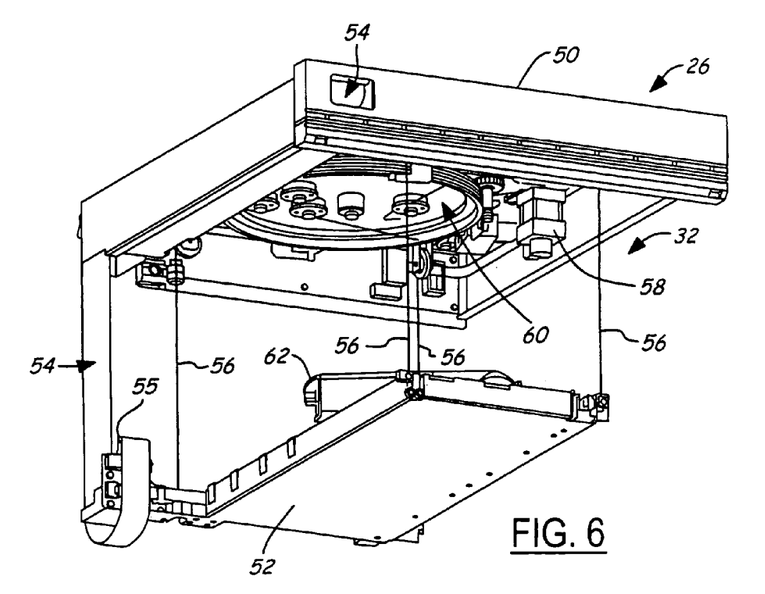
FIGS. 6 and 7 illustrate bottom-side perspective views of the robotics module with the free-hanging media element handling robot assembly being moved out from its recessed position within the robotics module and the communications cable being extended out from the robotics module.
Figure 7:
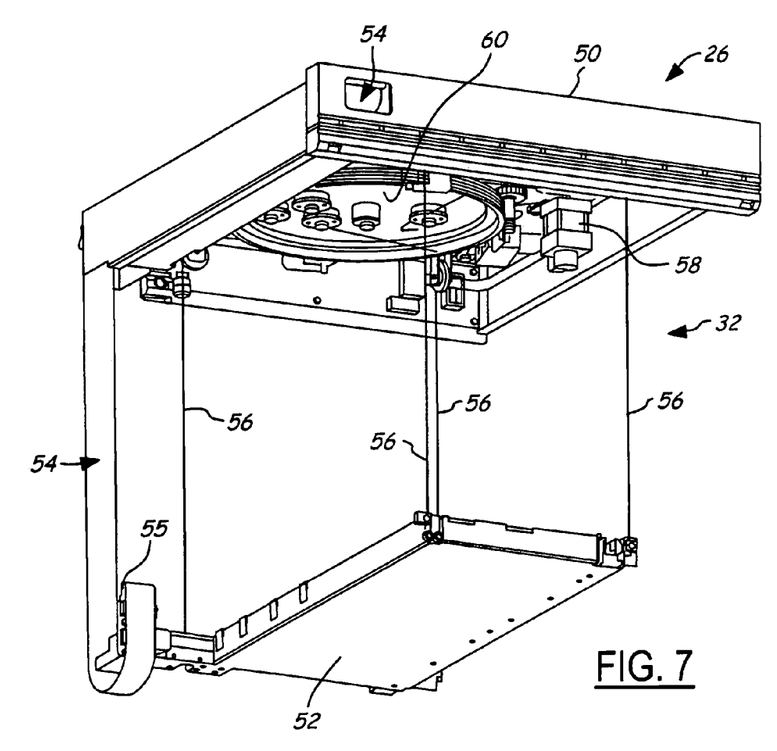

FIGS. 5, 6, and 7 illustrate top and bottom side perspective views of robotics module 26 with picker assembly 32 and its platform 52 being dropped down out from housing 50. A portion of communications cable 54 is extended out from robotics module 26. Communications cable 54 has a controller card connected at one end 55 to platform 52. As will be described in greater detail below, communications cable 54 enables electronic communication between an external device such as power/controller module 27 and picker assembly 32.

Picker assembly 32 includes four suspension cables 56 which are connected at each corner of platform 52. Suspension cables 56, such as steel rope cables, are fully wound up when platform 52 is fully recessed within housing 50. Suspension cables 56 unwind to lower platform 52 out from housing 50, and, as a result, the platform moves down along a z-direction as the suspension cables unwind. Similarly, platform 52 moves up along the z-direction as the suspension cables wind up from an unwound position.

Robotics module 26 includes a z-drive motor 58 for winding and unwinding suspension cables 56. Z-drive motor 58 drives a suspension cable wheel 60 in order to wind and unwind suspension cables 56. Suspension cables 56 are fully wound around wheel 60 when platform 52 is fully recessed within housing 50. Similarly, suspension cables 56 unwind from wheel 60 as platform 52 is lowered out from housing 50. Z-drive motor 58 is in communication with an external device such as power/controller module 27 for receiving commands to control the z-direction movement of platform 52.

Communications cable 54 releases from housing 50 of robotics module 26 as platform 52 is lowered out from the housing. As first end 55 of communications cable 54 is connected to platform 52, the platform pulls the communications cable out from housing 50 as the platform moves away from the housing in the z-direction along channel 30 formed by storage library modules 28. During operation, platform 52 will eventually move away from housing 50 to the extent of the maximum expansion of storage library 10, i.e., the platform will move to the lowest storage library module 28 in the vertical stack. The maximum extension of platform 52 away from robotics module 26 sets the length of the portion of communications cable 54 extending out from housing 50 of the robotics module.

Picker assembly 32 further includes a picker hand assembly 62 supported on a carriage assembly 64 movably connected to platform 52. Carriage assembly 64 is movable in an x-direction of motion along platform 52. An x-drive motor 66 drives carriage assembly 64 to move the carriage assembly along the x-direction. Hand assembly 62 moves in the x-direction of motion as carriage assembly 64 moves along the x-direction. Via communications cable 54, x-drive motor 66 is in communication with an external device such as power/controller module 27 for receiving commands to control the x-direction movement of carriage assembly 64.

Hand assembly 62 is also supported on carriage assembly 64 to be rotatable in a wrist direction of motion 68. Via communications cable 54, hand assembly 62 is in communication with an external device such as power/controller module 27 for receiving commands to control the wrist direction movement of the hand assembly.

Accordingly, hand assembly 62 has three directions of motion. One, hand assembly 62 is rotatable in the wrist direction of motion 68. Two, carriage assembly 64 moves hand assembly 62 along the x-direction. Three, platform 52 moves hand assembly 62 along the z-direction.

Hand assembly 62 is movable in the z-direction of motion to travel up-and-down through channel 30 formed by storage library modules 28 in order to move up-and-down amongst the storage library modules and to move up-and-down amongst a particular storage library module. Hand assembly 62 is movable in the x-direction of motion to move across a storage library module. Hand assembly 62 is rotatable in the wrist direction of motion to move next to a cell and/or a drive in order to grab a cartridge from its cell and insert this cartridge into another cell and/or another drive.

As described, robotics module 26 contains a free-hanging media picker assembly 32. The free-hanging design of picker assembly 32 enables robotics module 26 to be self-contained. That is, there is no attachment at bottom rack portion 16 as would be required with a pulley system. Because picker assembly 32 has a free-hanging configuration, there is no complicated support or drive structure required for operation of the picker assembly. Accordingly, picker assembly 32 is not affected by capacity upgrades. For instance, adding capacity to storage library 10 entails adding cartridges and/or drives to the storage library but does not entail adding any more media element handling robotics hardware.

As a result, the capacity of storage library 10 can be expanded by simply adding storage library modules 28, not having media element handling robotics, at a position below robotics module 26. As indicated above, communications cable 54 has a sufficient length to support the maximum extent of picker assembly 32 along channel 30 formed by storage library modules 28 and, consequently, has a sufficient length to support the capacity expansion of storage library 10.

It is further noted that storage library 10 may remain operational while robotics module 26 is removed from the storage library. For example, in this case, drives 40 may still function to read and write to cartridges 45 mounted within the drives while robotics module 26 is dismounted out of rack 12 of storage library 10.

Figure 8:
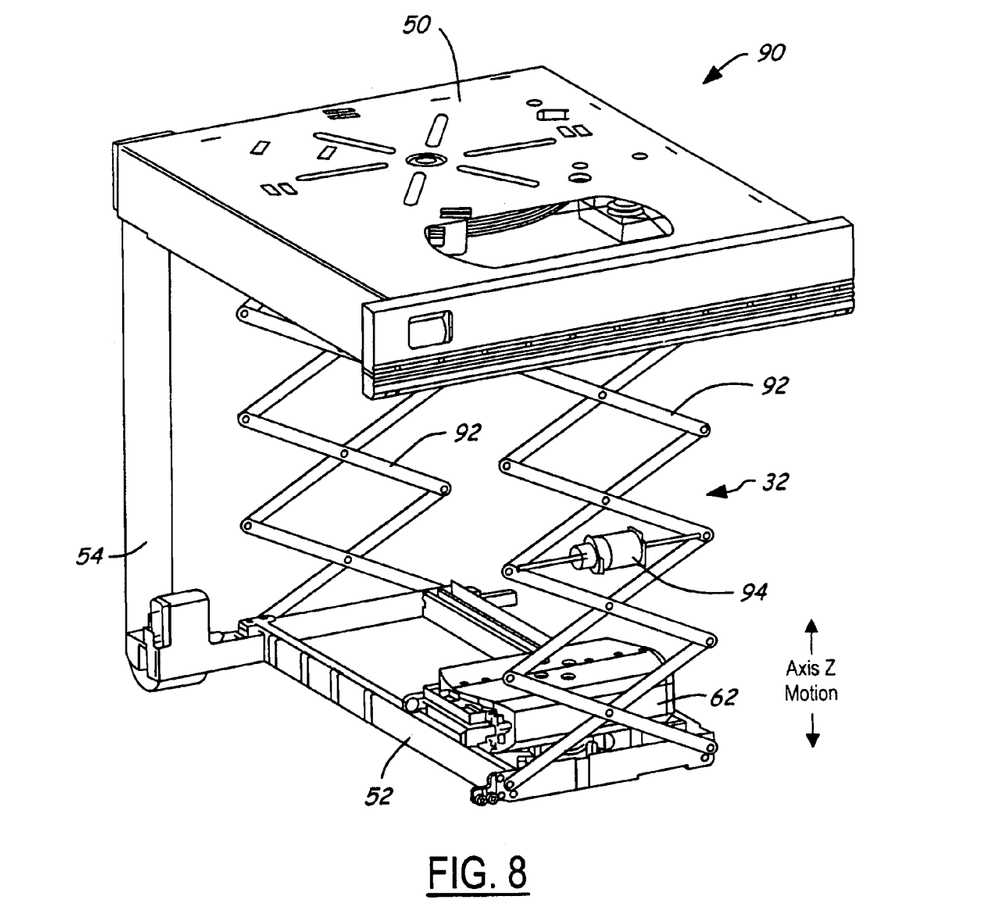
FIG. 8 illustrates a top-side perspective view of a self-contained robotics module having a free-hanging media element handling robot assembly in accordance with another embodiment in which the robot assembly is moved out from its recessed position within the robotics module and the communications cable is extended out from the robotics module.

Referring now to FIG. 8, a top-side perspective view of a self-contained robotics module 90 in accordance with another embodiment is shown. Robotics module 90 includes many of the same elements as robotics module 26 and like components have the same reference numerals. In FIG. 8, picker assembly 32 is moved out from housing 50. Robotics module 90 includes two scissor mechanism legs 92 which are connected at each corner of platform 52. Legs 92 are fully contracted when platform 52 is fully recessed within housing 50. Legs 92 expand to lower platform 52 out from housing 50, and, as a result, the platform down moves along the z-direction as the legs expand. Similarly, platform 52 moves up along the z-direction as legs 92 contract from an expanded position. Robotics module 26 includes a z-drive actuator 94 for contracting and expanding legs 92.

It is noted that the configuration of robotics module 90 lends itself to be placed at other locations in rack 12 than being placed adjacent to top rack portion 14 as with robotics module 26. For instance, robotics module 90 may be effectively flipped upside down and placed near bottom rack portion 16. In this event, legs 92 expand to raise (as opposed to lower) platform 52 to move out from housing 50 and move upward (as opposed to downward) along the z-direction. Robotics module 90 may also be effectively placed on its side. In this case, legs 92 expand and contract to move side-to-side.

Thus, it is apparent that there has been provided, in accordance with the present invention, a storage library having a free-hanging media element handling robot assembly that fully satisfies the objects, aims, and advantages set forth above. While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A storage library comprising:
   a frame having an interior and a frame length;
   a first storage library module having a first set of media element holding cells, the first storage library module being mounted to the frame at a first position along the frame length, the frame supporting the first storage library module such that the first set of cells are positioned within the frame interior at the first frame length position and along the periphery of a channel extending within the frame interior through the frame length;
   a second storage library module having a second set of media element holding cells, the second storage library module being mountable to the frame at a second position along the frame length, the frame supporting the second storage library module when the second storage library module is mounted to the frame such that the second set of cells are positioned within the frame interior at the second frame length position and along the periphery of the channel;
   a media element handling assembly having a support, a platform, a suspension drive, and a picker assembly, the support being connected to the frame at a third position along the frame length and the suspension drive being connected to the support, the platform being movably connected to the suspension drive and the picker assembly being supported on the platform;
   wherein the first and second storage library modules are void of media element handling assembly hardware for moving the picker assembly through the channel along the frame length;
   wherein the suspension drive movably suspends the platform to move the picker assembly through the channel along the frame length so that the picker assembly may move toward the first frame length position and manipulate media elements held by the first set of cells and toward the second frame length position and manipulate media elements held by the second set of cells when the second storage library module is mounted to the frame.

2. A storage library comprising:
   a frame having top and bottom ends and an interior, the top and bottom frame ends being separated by a frame length;
   a media element handling assembly having a support, a platform, a suspension drive and a picker assembly, the support being connected to the top frame end and the suspension drive being connected to the support, the platform being movably connected to the suspension drive and the picker assembly being supported on the platform;
   a first storage library module having a first set of media element holding cells, the first storage library module being mounted to the frame beneath the top frame end at a first position along the frame length, the frame supporting the first storage library module such that the first set of cells are positioned within the frame interior at the first frame length position and along the periphery of a channel extending within the frame interior between the top and bottom frame ends through the frame length;
   a second storage library module having a second set of media element holding cells, the second storage library module being mountable to the frame beneath the top frame end at a second position along the frame length, the frame supporting the second storage library module when the second storage library module is mounted to the frame such that the second set of cells are positioned within the frame interior at the second frame length position and along the periphery of the channel;
   wherein the first and second storage library modules are void of media element handling assembly hardware for moving the picker assembly through the channel along the frame length;
   wherein the suspension drive movably suspends the platform to move the picker assembly through the channel along the frame length between the top and bottom frame ends so that the picker assembly may move toward the first frame length position and manipulate media elements held by the first set of cells and toward the second frame length position and manipulate media elements held by the second set of cells when the second storage library module is mounted to the frame.

3. The library of claim 2 further comprising:
a third storage library module having a media element player and being void of media element handling assembly hardware for moving the picker assembly through the channel along the frame length, the third storage library module being mountable to the frame beneath the top frame end at a third position along the frame length, the frame supporting the third storage library module when the third storage library module is mounted to the frame such that the media element player is positioned within the frame interior at the third frame length position and along the periphery of the channel;
wherein the suspension drive movably suspends the platform to move the picker assembly through the channel so that the picker assembly may move toward the first and third frame length positions and load media elements held by the first set of cells into the media element player when the third storage library module is mounted to the frame.

4. A storage library comprising:
a frame having top and bottom ends and an interior, the top and bottom frame ends being separated by a frame length;
a first storage library module having a first set of media element holding cells, the first storage library module being mounted to the frame beneath the top frame end at a first position along the frame length, the frame supporting the first storage library module such that the first set of cells are positioned within the frame interior at the first frame length position and along the periphery of a channel extending within the frame interior between the top and bottom frame ends through the frame length; and
a media element handling assembly having a support, a platform, a suspension drive mechanism, and a picker assembly, the support being connected to the top frame end and the suspension drive mechanism being connected to the support, the platform being movably connected to the suspension drive mechanism and the picker assembly being supported on the platform, wherein the suspension drive mechanism movably suspends the platform away from the support in order to move the picker assembly through the channel along the frame length between the top and bottom frame ends so that the picker assembly may move toward the first frame length position and manipulate media elements held by the first set of cells.

5. The library of claim 4 wherein:
the first storage library module is void of media element handling assembly hardware for moving the picker assembly through the channel.

6. The library of claim 4 further comprising:
a second storage library module having a second set of media element holding cells, the second storage library module being mountable to the frame beneath the top frame end at a second position along the frame length, the frame supporting the second storage library module when the second storage library is mounted to the frame such that the second set of cells are positioned within the frame interior at the second frame length position and along the periphery of the channel;
wherein the suspension drive mechanism movably suspends the platform to move the picker assembly through the channel along the frame length between the top and bottom frame ends so that the picker assembly may move toward the second frame length position and manipulate media elements held by the second set of cells when the second storage library module is mounted to the frame.

7. The library of claim 6 wherein:
the second storage library module is void of media element handling assembly hardware for moving the picker assembly through the channel.

8. The library of claim 6 wherein:
the first storage library module further includes a first media player, the frame supporting the first storage library module such that the first media player is positioned within the frame interior at the first frame length position on the periphery of the channel;
wherein the suspension drive mechanism movably suspends the platform to move the picker assembly through the channel so that the picker assembly may move toward the first and second frame length positions and load media elements held by the first and second sets of cells into the first media player when the second storage library module is mounted to the frame.

9. The library of claim 4 wherein:
the suspension drive mechanism movably retracts the platform back towards the support in order to move the picker assembly through the channel along the frame length from the bottom frame end to the top frame end.

10. The library of claim 9 wherein:
the suspension drive mechanism includes suspension cables connected to the platform for movably suspending the platform away and toward the support.

11. The library of claim 9 wherein:
the suspension drive mechanism includes scissor legs connected to the platform for movably suspending the platform away and toward the support.

12. The library of claim 4 wherein:
the platform includes a carriage assembly operable for moving the picker assembly across the platform.

13. The library of claim 4 wherein:
the picker assembly is rotatably supported on the platform.

14. The library of claim 4 wherein:
the media element handling assembly further includes a communication cable connected at one end to the picker assembly via the platform and connected at the other end to the support, the communication cable being operable to suspend out from the support as the platform moves away from the support, the communication cable enabling communication with the picker assembly.

15. The library of claim 4 wherein:
the top and bottom frame ends are vertically separated by the frame length.

16. A storage library comprising:
a frame having top and bottom ends and an interior, the top and bottom frame ends being separated by a frame length;
a media element handling assembly having a support, a platform, a suspension drive, and a picker assembly, the support being connected to the bottom frame end and the suspension drive being connected to the support, the platform being movably connected to the suspension drive and the picker assembly being supported on the platform;

a first storage library module having a first set of media element holding cells, the first storage library module being mounted to the frame above the bottom frame end at a first position along the frame length, the frame supporting the first storage library module such that the first set of cells are positioned within the frame interior at the first frame length position and along the periphery of a channel extending within the frame interior between the top and bottom frame ends through the frame length;

a second storage library module having a second set of media element holding cells, the second storage library module being mountable to the frame above the bottom frame end at a second position along the frame length, the frame supporting the second storage library module when the second storage library module is mounted to the frame such that the second set of cells are positioned within the frame interior at the second frame length position and along the periphery of the channel;

wherein the first and second storage library modules are void of media element handling assembly hardware for moving the picker assembly through the channel along the frame length;

wherein suspension drive movably suspends the platform to move the picker assembly through the channel along the frame length between the top and bottom frame ends so that the picker assembly may move toward the first frame length position and manipulate media elements held by the first set of cells and toward the second frame length position and manipulate media elements held by the second set of cells when the second storage library module is mounted to the frame.

17. A method for a storage library having a frame with an interior and a frame length, the storage library further having a media element handling assembly having a support, a platform, a suspension drive, and a picker assembly with the support being connected to the frame, the suspension drive being connected to the support, the platform being movably connected to the suspension drive, and the picker assembly being supported on the platform, the method comprising:

mounting a first storage library module having a first set of media element holding cells to the frame at a first position along the frame length away from the support such that the first set of cells are positioned within the frame interior at the first frame length position and along the periphery of a channel extending within the frame interior through the frame length;

suspendably moving, by the suspension drive, the platform to move the picker assembly through the channel along the frame length toward the first set of cells for the picker assembly to manipulate media elements held by the first set of cells;

after the picker assembly has manipulated a media element held by one of the first set of cells, expanding the capacity of the storage library by mounting a second storage library module having a second set of media element holding cells to the frame at a second position along the frame length away from the support such that the second set of cells are positioned within the frame interior at the second frame length position and along the periphery of the channel; and suspendably moving, by the suspension drive, the platform to move the picker assembly through the channel along the frame length toward the second set of cells for the picker assembly to manipulate media elements held by the second set of cells.

18. The method of claim 17 further comprising:

after the picker assembly has manipulated a media element held by one of the second set of cells, expanding the capacity of the storage library further by mounting a third storage library module having a third set of media element holding cells to the frame at a third position along the frame length away from the support such that the third set of cells are positioned within the frame interior at the third frame length position and along the periphery of the channel; and suspendably moving, by the suspension drive, the platform to move the picker assembly through the channel along the frame length toward the third set of cells for the picker assembly to manipulate media elements held by the third set of cells.

19. The method of claim 17 further comprising:

after the picker assembly has manipulated a media element held by one of the first set of cells, reducing the capacity of the storage library by dismounting one of the first and second storage library modules from the frame; and suspendably moving, by the suspension drive, the platform to move the picker assembly through the channel along the frame length toward the set of cells remaining within the frame interior for the picker assembly to manipulate media elements held by the remaining set of cells.

* * * * *